(12) United States Patent  
Sakata (10) Patent No.: US 7,683,541 B2  
(45) Date of Patent: Mar. 23, 2010

(54) DISPLAY APPARATUS PROVIDED WITH MOVABLE SUBSTRATE COVERS SECURING EDGES OF A FRONT COVER AND ITS CORRESPONDING REINFORCING PLATE

(75) Inventor: Tatsuya Sakata, Tokyo (JP)

(73) Assignee: Sony Corporation, Tokyo (JP)

( * ) Notice: Subject to any disclaimer, the term of this patent is extended or adjusted under 35 U.S.C. 154(b) by 565 days.

(21) Appl. No.: 11/714,109

(22) Filed: Mar. 6, 2007

(65) Prior Publication Data

US 2007/0218411 A1 Sep. 20, 2007

(30) Foreign Application Priority Data

Mar. 7, 2006 (JP) ............................. 2006-061797

(51) Int. Cl.  
*H01L 51/52* (2006.01)  
*H05K 5/00* (2006.01)  
*H05K 7/00* (2006.01)

(52) U.S. Cl. .................. 313/512; 313/511; 361/679.01; 361/679.21

(58) Field of Classification Search ......... 313/500–512; 361/679.01, 679.21  
See application file for complete search history.

(56) References Cited

U.S. PATENT DOCUMENTS

| 5,838,401 | A | * | 11/1998 | Uehara | ......................... 349/58 |
| 6,812,976 | B2 | * | 11/2004 | Satonaka | ................ 361/679.21 |
| 2001/0003471 | A1 | * | 6/2001 | Lee et al. | ..................... 361/681 |
| 2006/0209502 | A1 | | 9/2006 | Sakata et al. | |

FOREIGN PATENT DOCUMENTS

| JP | 5-103284 | | 4/1993 |
| JP | 10333128 | A * | 12/1998 |
| JP | 2006-221058 | | 8/2006 |

* cited by examiner

*Primary Examiner*—Mariceli Santiago  
(74) *Attorney, Agent, or Firm*—Finnegan, Henderson, Farabow, Garrett & Dunner, L.L.P.

(57) ABSTRACT

A display apparatus including: a rectangular thin plate form display device with a surface on one side in the thickness direction thereof as a display surface configured to display an image and with a surface on the other side as a back surface; rigid substrates each connected to an edge of the display device through a flexible substrate, operative to drive the display device, and each being elongate along the edge of the display device; a front cover covering the display surface of the display device; a rectangular thin plate form reinforcing plate attached to the back surface of the display device; and a rear cover covering the back surface of the display device and a back surface of the reinforcing plate.

9 Claims, 9 Drawing Sheets

DISPLAY APPARATUS PROVIDED WITH MOVABLE SUBSTRATE COVERS SECURING EDGES OF A FRONT COVER AND ITS CORRESPONDING REINFORCING PLATE

CROSS REFERENCES TO RELATED APPLICATIONS

The present invention contains subject matter related to Japanese Patent Application JP 2006-061797 filed in the Japanese Patent Office on Mar. 7, 2006, the entire contents of which being incorporated herein by reference.

BACKGROUND OF THE INVENTION

1. Field of the Invention
The present invention relates to a display apparatus.
2. Description of the Related Art
As a display apparatus having a thin plate form display device such as an organic EL (Electronic Luminescent) display, a plasma display and a liquid crystal display, there is one having a front cover covering a display surface of a display device and a rear cover covering the opposite side of the display surface (refer to Japanese Patent Laid-open No. Hei 5-103284).

In such a display apparatus, rectangular window (opening) is provided on the front cover, for example, to expose display surface of the display device to frontward from inside of the window.

In such a display apparatus, the part of the front cover is located, like a picture frame, in an annular region along the outer edges of the display surface of the display device. Therefore, a step is generated between the front cover part and the display surface, so that the front cover part occupies a space on the front side of the display surface, in an amount corresponding to the magnitude of the step. This is disadvantageous in reducing the space occupied by the display apparatus in the direction orthogonal to the display surface of the display device, in other words, the size of the display apparatus in the thickness direction thereof.

SUMMARY OF THE INVENTION

In view of the above, the present applicant has proposed a display apparatus in which a transparent film (front cover) is adhered to the whole area of a display surface of a thin plate form display device, the outer edges extending from the film part adhered to the display surface to the outer sides of the display surface and constituting end parts in the extension directions are joined to side walls of a rear cover, and a front surface of the display apparatus is composed of the film (Japanese Patent Laid-open No. 2006-221058).

According to this display apparatus, the front surface of the display apparatus is composed of the transparent film attached to the whole area of the display surface. Unlike the related art, therefore, the front cover is absent on the outside of the display surface, which is advantageous in reducing the space occupied by the display apparatus in the direction orthogonal to the display surface, i.e., the size of the display apparatus in the thickness direction thereof.

Meanwhile, in such a display apparatus, for securing appearance quality of the joint parts between the outer edges of the film and the side walls of the rear cover, it may be necessary to minimize the clearances (gaps) between the outer edges of the film and the side walls of the rear cover. Therefore, it would be necessary to enhance the dimensional accuracy of the outer edges of the film and the side walls of the rear cover, so that the yields of the film (front cover) and the rear cover would be low, which is disadvantageous in reducing the manufacturing cost.

Accordingly, in the embodiments of the present invention, it is desirable to provide a display apparatus which is advantageous in securing appearance quality while contriving a reduction in manufacturing cost.

According to an embodiment of the present invention, there is provided a display apparatus including: a rectangular thin plate form display device with a surface on one side in the thickness direction thereof as a display surface for displaying a image and with a surface on the other side as a back surface; rigid substrates each connected to an edge of the display device through a flexible substrate, operative to drive the display device, and each being elongate along the edge of the display device; a front cover covering the display surface of the display device; a rectangular thin plate form reinforcing plate attached to the back surface of the display device; and a rear cover covering the back surface of the display device and a back surface of the reinforcing plate, the front cover having a front surface part located on the front side of the display surface, and side surface parts bent respectively from four edges of the front surface part to the rear side, wherein the rigid substrates are bent to the rear side respectively via the corresponding flexible substrates and are respectively overlapped with and attached to the four edges of the back surface of the reinforcing plate; substrate covers are provided for respectively covering the rigid substrates overlapped with the four edges of the back surface of the reinforcing plate; the substrate covers each have a back surface part located on the rear side of the rigid substrate, and a side surface part bent from an end portion of the back surface part to the front side, and are movable in the directions for spacing away respectively from the edges of the reinforcing plate in the plane of the reinforcing plate; and outside surfaces of front portions of the side surface parts of the substrate covers are set in contact with, and joined to, the inside surfaces of the side surface parts of the front cover.

In the embodiments of the present invention, utilization of the substrate covers covering the rigid substrates ensures that the outside surfaces of the side surface parts of the substrate covers and the inside surfaces of the side surface parts of the front cover can be joined to each other, respectively, in the condition where the outside surfaces of the side surface parts of the substrate covers and the inside surfaces of the side surface parts of the front cover are in contact with each other, respectively. Therefore, the appearance quality of the joined portions of the front cover can be enhanced, without enhancing the dimensional accuracies of the substrate covers and the front cover.

Accordingly, unlike in the related art, the front cover and the rear cover can be manufactured without need for high dimensional accuracies with respect to the front cover and the rear cover. This is advantageous in enhancing the appearance quality of the display apparatus while contriving a reduction in the manufacturing cost.

The above and other features and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

First Embodiment

Now, embodiments of the display apparatus in the present invention will be described in detail below, based on the drawings.

Figure 1:
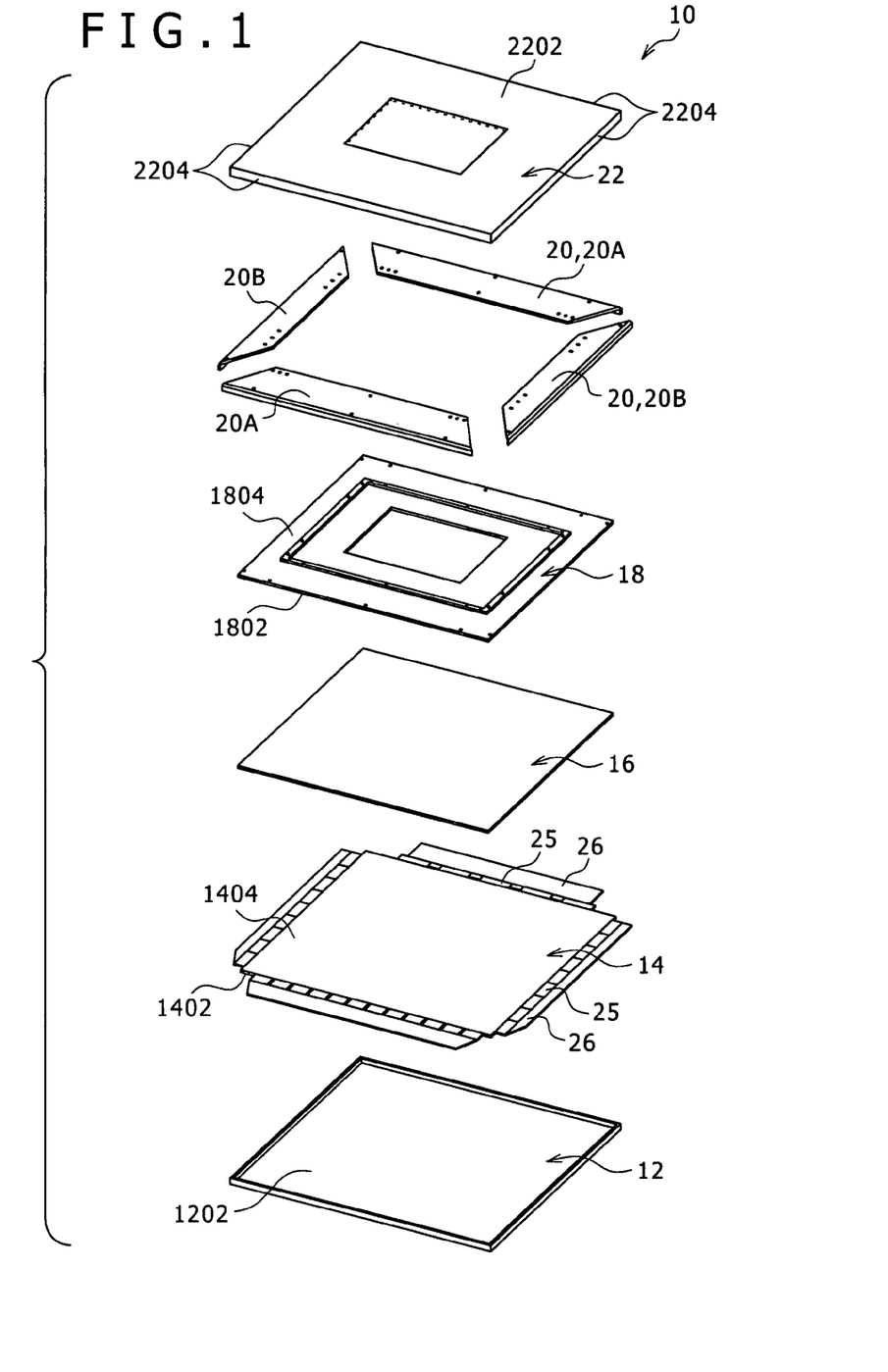
FIG. 1 is an exploded perspective view of a display apparatus according to a first embodiment of the present invention.

FIG. 1 is an exploded perspective view of the display apparatus 10 according to a first embodiment.

As shown in FIG. 1, the display apparatus 10 includes a front cover 12, a display device 14, a heat conductive sheet 16, a reinforcing plate 18, four substrate covers 20, a rear cover 22 and the like.

The display device 14 is formed in a rectangular thin plate-like shape being small in thickness, a display surface 1402 is provided on one side in the thickness direction of the display device 14, and the surface on the other side in the thickness direction is a back surface 1404.

In this embodiment, the display device 14 is composed of an organic EL (Electronic Luminescent) display, and is so configured that a image including a still image, a motion image, characters, symbols or the like is displayed on the display surface 1402, based on drive signals.

The organic EL display is composed of a first glass plate and a second glass plate laid over each other, and phosphors (illuminants), electrodes, etc. provided between the glass plates, wherein a display part for displaying the above-mentioned image is composed of the phosphors, electrodes, etc.

A surface, fronting on the opposite side of the display part (the front side), of the first glass plate constitutes the display surface 1402, and a surface, fronting on the opposite side of the display part (the rear side), of the second glass plate constitutes the back surface 1404.

Rigid substrates 26 are connected to the four sides of the display device 14 through flexible substrates 25, respectively.

Each rigid substrate 26 is for driving the display device 14 through the flexible substrate 25, is formed in an elongate shape along each side of the display device 14, and extends in parallel to each side.

More in detail, electronic parts (chip parts) constituting a drive circuit and a power circuit are mounted on each rigid substrate 26.

Incidentally, the drive circuit is operative to generate the drive signal based on a signal supplied from the exterior and to supply the drive signal to the display device 14. Here, the signal supplied from the exterior is, for example, a signal representing characters, symbols, a still image and/or a motion image which is supplied from a control unit of a personal computer, or a signal representing a still image and/or a motion image which is supplied from a DVD player, a TV tuner, a video camera or the like; the system of supplying the signal may be a wired system or a wireless system.

The power circuit is operative to generate a power source for driving the display device 14 or a power source for driving the drive circuit, based on a power supply in the exterior or the inside of the display apparatus 10 and to supply the power sources to the display device 14 and the drive circuit. Incidentally, the power supply may be based on utilization of a battery provided in the display apparatus 10, or may be supplied from the exterior either wiredly or wirelessly. In addition, the display apparatus 10 is not limited to the above-mentioned one supplied with the signal from an external apparatus; namely, the present invention is applicable also to the cases where, for example, the display apparatus 10 is incorporated in any of various electronic apparatuses such as TV set, personal computer, PDA, mobile phone, etc.

The front cover 12 covers the display surface 1402 of the display device 14 and side portions of the display device 14 and the reinforcing plate 18. The front cover 12 is transparent. The front cover 12 is adhered to the display surface 1402 by, for example, a transparent pressure sensitive adhesive double coated tape adhered to the whole area of the display surface 1402.

Figure 7:
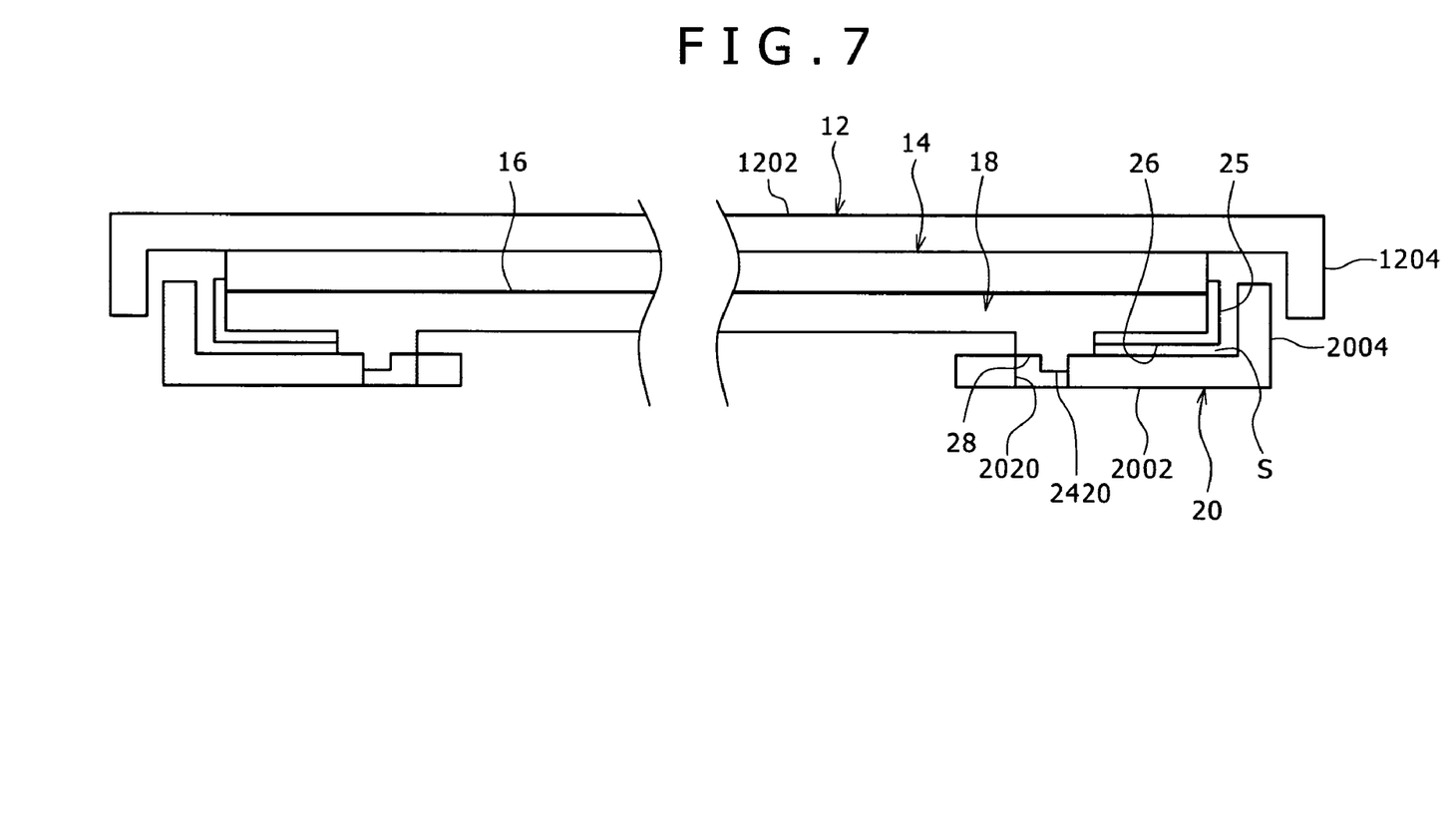
FIG. 7 illustrates the condition where the substrate cover is tentatively fixed to the reinforcing plate.

The front cover 12 has a front surface part 1202 located on the front side of the display surface 1402, and side surface parts 1204 bent rearwards from the four sides of the front surface part 1202 and located on lateral sides of the display device 12 and the reinforcing plate 18 (see FIG. 7).

The front surface part 1202 is formed in a rectangular shape larger in area than the display surface 1402. The four sides of the front surface part 1202 are located on the outer sides of, and are respectively parallel to, the four sides of the display surface 1402 (see FIG. 7).

In this embodiment, the front cover 12 is a film treated with an AR (anti-reflection) coating so as to prevent mirroring (reflection) into the display surface 1402 of the display device 14. The film is formed of a synthetic resin material such as PET (polyethylene terephthalate), acrylic resin, PC (polycarbonate), etc. and has a thickness of, for example, about 0.2 mm.

As shown in FIG. 1, the heat conductive sheet 16 is thermally conductive, and is attached to the whole area of the back surface 1404 of the display device 14.

Figure 2:
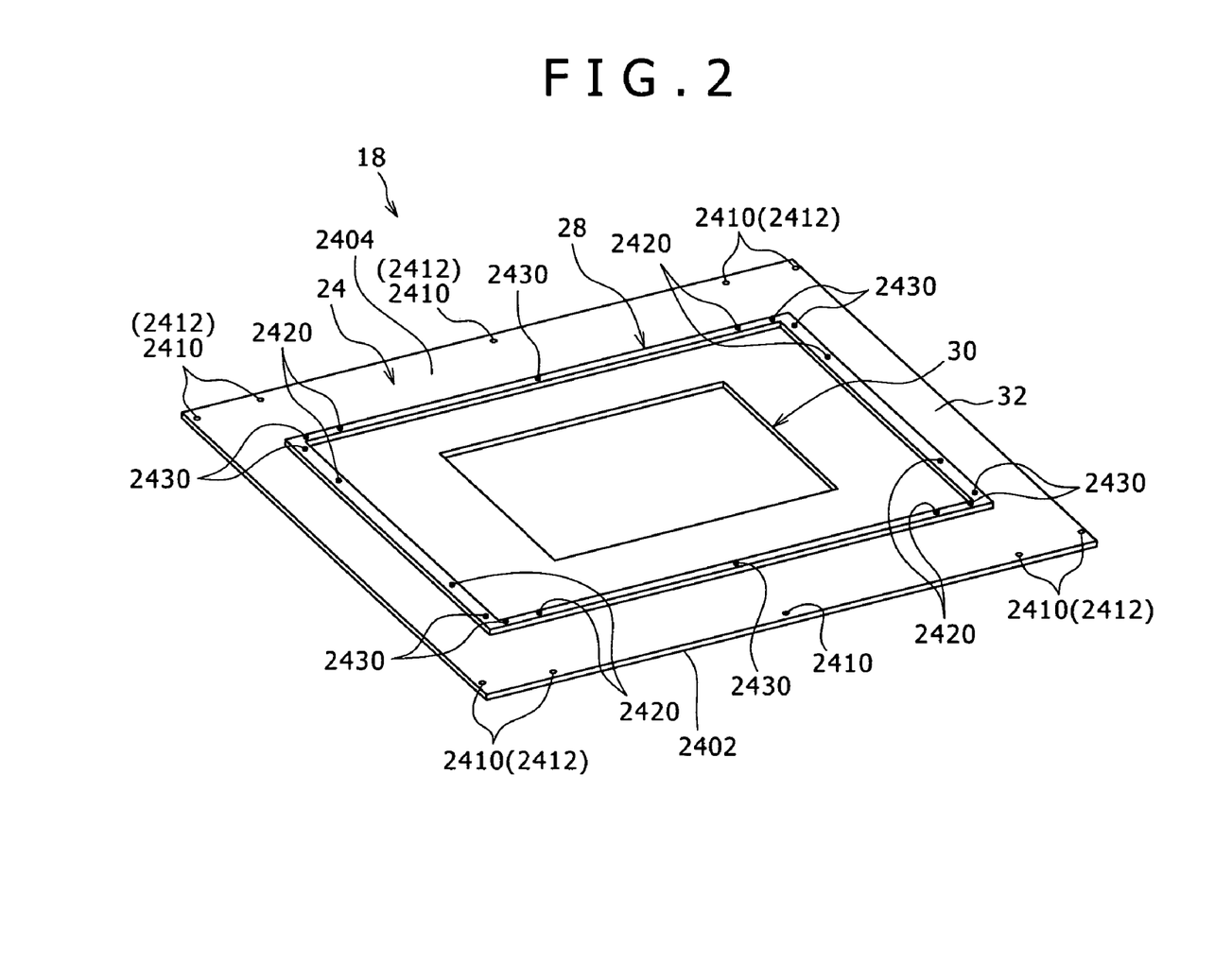
FIG. 2 is a perspective view of a reinforcing plate.
Figure 3:
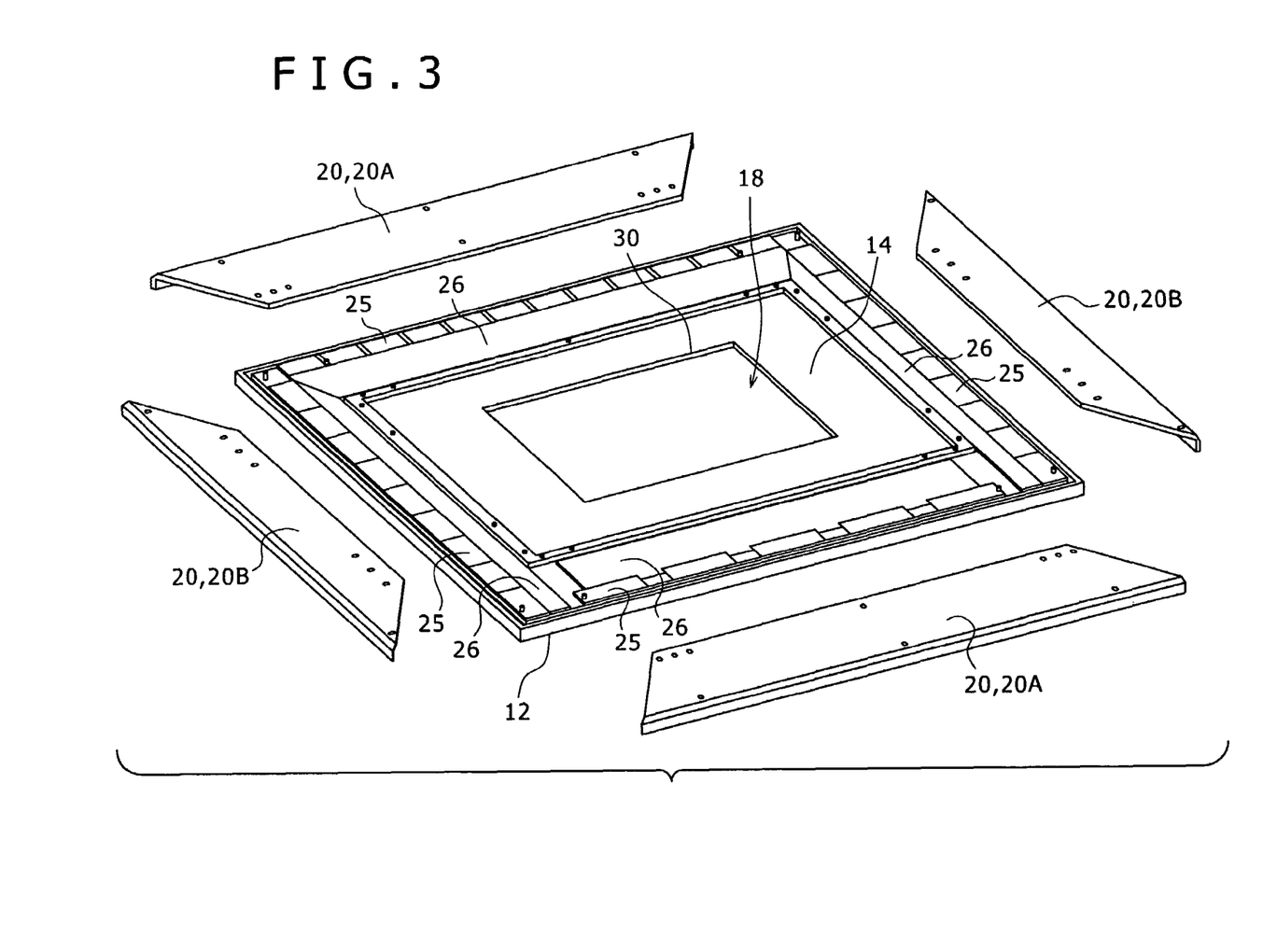
FIG. 3 is a perspective view showing the mounting of a display device, the reinforcing plate, a flexible substrate, a rigid substrate, and a substrate cover.

FIG. 2 is a perspective view of the reinforcing plate 18, and FIG. 3 is a perspective view showing the mounting of the display device 14, the reinforcing plate 18, the flexible substrates 25, the rigid substrates 26, and the substrate covers 20.

As shown in FIG. 2, the reinforcing plate 18 has a rectangular thin plate-like shape, and is attached to the heat conductive sheet 16 through a pressure sensitive adhesive double coated tape. Therefore, the reinforcing plate 18 is attached to the back surface 1404 of the display device 14 through the heat conductive sheet 16.

The reinforcing plate 18 is formed of a metallic material having a rigidity sufficient for reinforcing the display device 14 and has a high thermal conductivity and an excellent heat radiating property. Examples of the metallic material include magnesium and aluminum. This ensures that the rigidity of the display device 14 is secured, and the heat generated in the display device 14 is efficiently radiated through the heat conductive sheet 16 and the reinforcing plate 18.

The reinforcing plate 18 includes a body plate part 24, a frame 28, and a rib 30.

The body plate part 24 has a rectangular thin plate-like shape, and has a profile equal in shape and size to the back surface 1404 of the display device 14.

The body plate part 24 has a structure in which one side in the thickness direction is a front face 2402 opposite to the back surface 1404 of the display device 14 and the other side in the thickness direction is a back surface 2404.

The frame 28 has a rectangular frame-like shape smaller in size than the body plate part 24, and is provided in the center of the back surface 2404 of the body plate part 24, while having its four edges respectively parallel to the four edges of the body plate part 24.

A rectangular frame-like region 32 is formed between the four edges of the frame 28 and the four edges of the body plate part 24.

As shown in FIG. 3, each of the rigid plates 26 is bent backwards through the corresponding flexible substrate 25, is laid on the rectangular frame-like region 32, and is attached to the region 32 through a pressure sensitive adhesive double coated tape or the like.

The rib 30, on the inner side of the frame 28, has a rectangular frame-like shape smaller in size than the frame 28, and is provided in the center of the back surface 2404 of the body plate part 24, while having its four edges respectively parallel to the four edges of the body plate part 24.

The frame 28 and the rib 30 have the function of reinforcing the body plate part 24 and enhancing rigidity.

In addition, as shown in FIG. 2, one pair of opposed edges (major edges), of the four edges of the back surface 2404 of the body plate part 24, are each projectingly provided with three boss parts 2410 which are located at regular intervals along the extending direction thereof, have a height equal to the height of the frame 28 and are provided with screw holes 2412 in tip portions thereof.

Besides, the other pair of opposed edges (minor edges) are each projectingly provided with boss parts 2410 which are located at positions near both ends in the extending direction thereof, have a height equal to the height of the above-mentioned three boss parts 2410 and are provided with screw holes 2412 in tip portions thereof.

In addition, of the four sides of the frame 28, one pair of opposed edges (major edges) are each projectingly provided with guide pins 2420 at positions near both ends in the extending direction thereof, and the other pair of opposed edges (minor edges) are also each projectingly provided with guide pins 2420 at positions near both ends in the extending direction thereof.

Besides, the one pair of opposed edges (major edges) of the frame 28 are each provided with three screw holes 2430 at regular intervals along the extending direction thereof, and the other pair of opposed edges (minor edges) are also each provided with screw holes 2430 at positions near both ends in the extending direction thereof so that the two guide pins 2420 are located between the screw holes 2430.

Figure 4A:
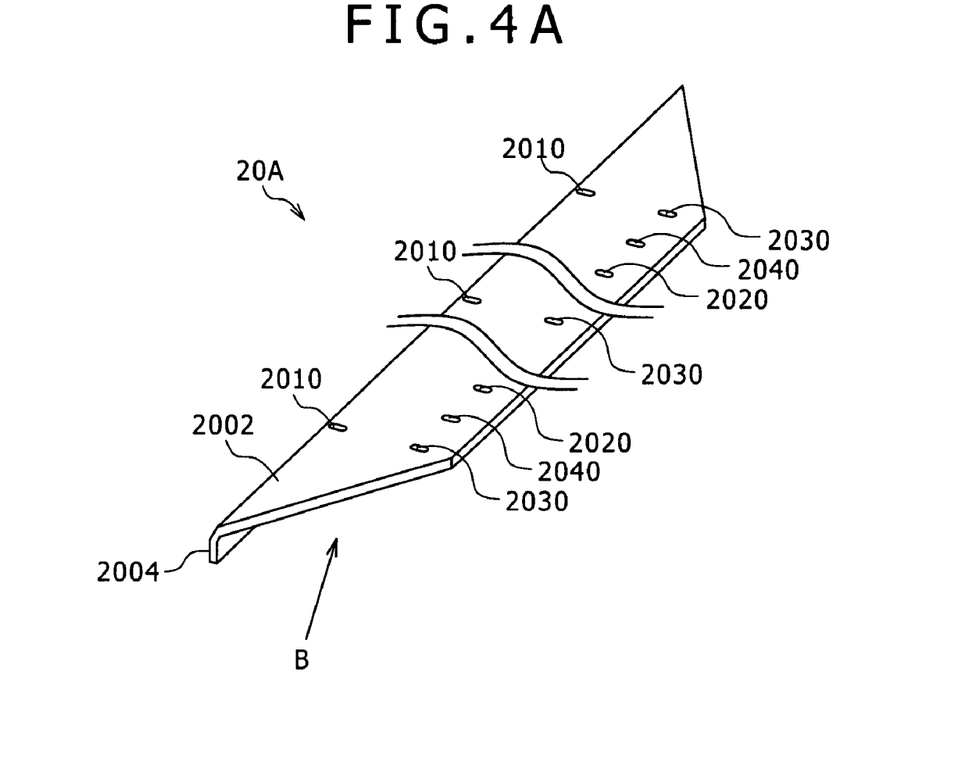
FIG. 4A is a perspective view of a substrate cover.
Figure 4B:
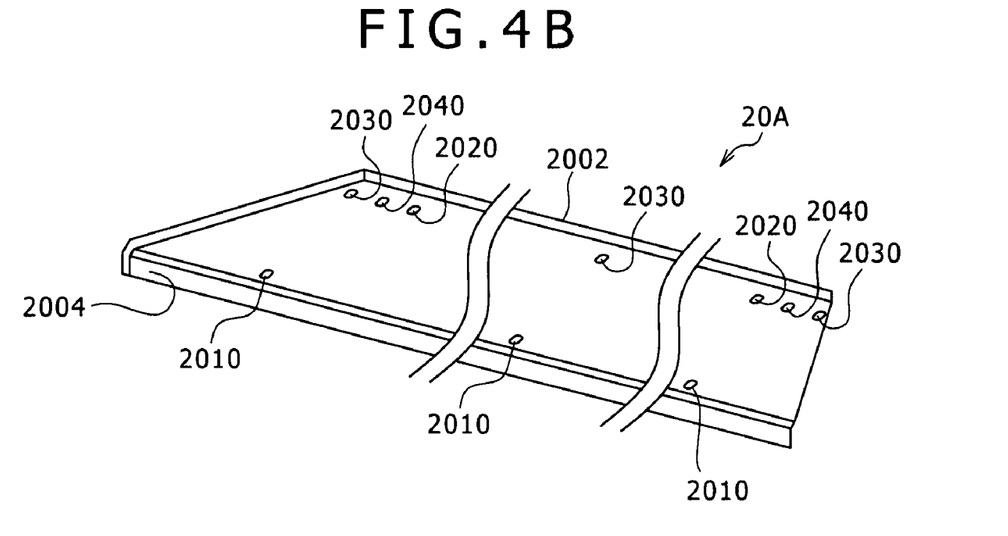
FIG. 4B is a view along arrow B of FIG. 4A.

FIG. 4A is a perspective view of a substrate cover 20A, and FIG. 4B is a view along arrow B of FIG. 4A.

Figure 5A:
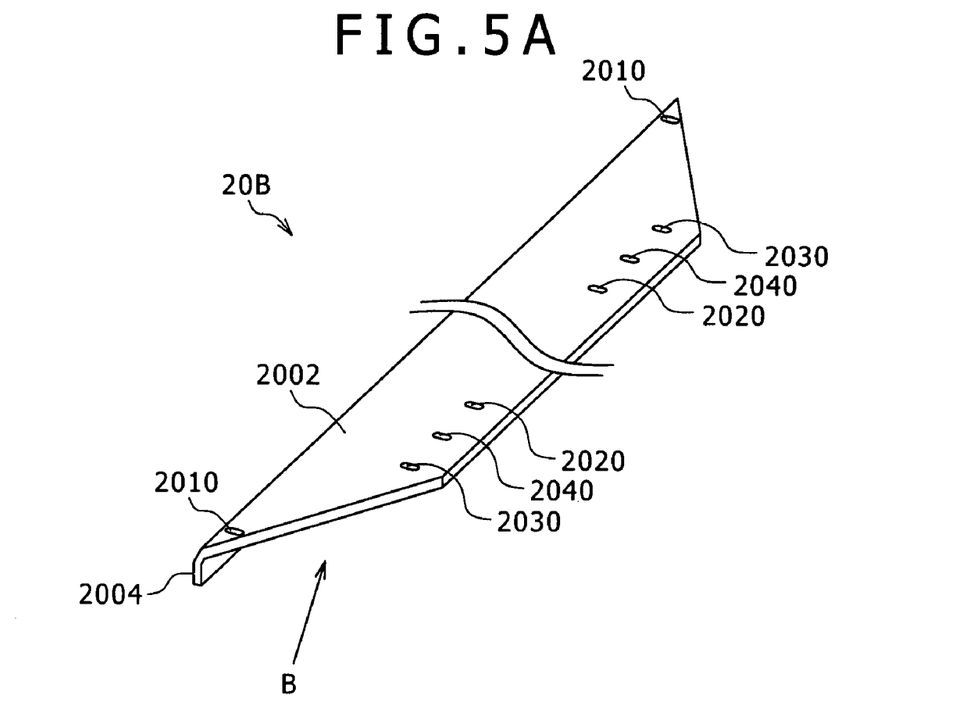
FIG. 5A is a perspective view of a substrate cover.
Figure 5B:
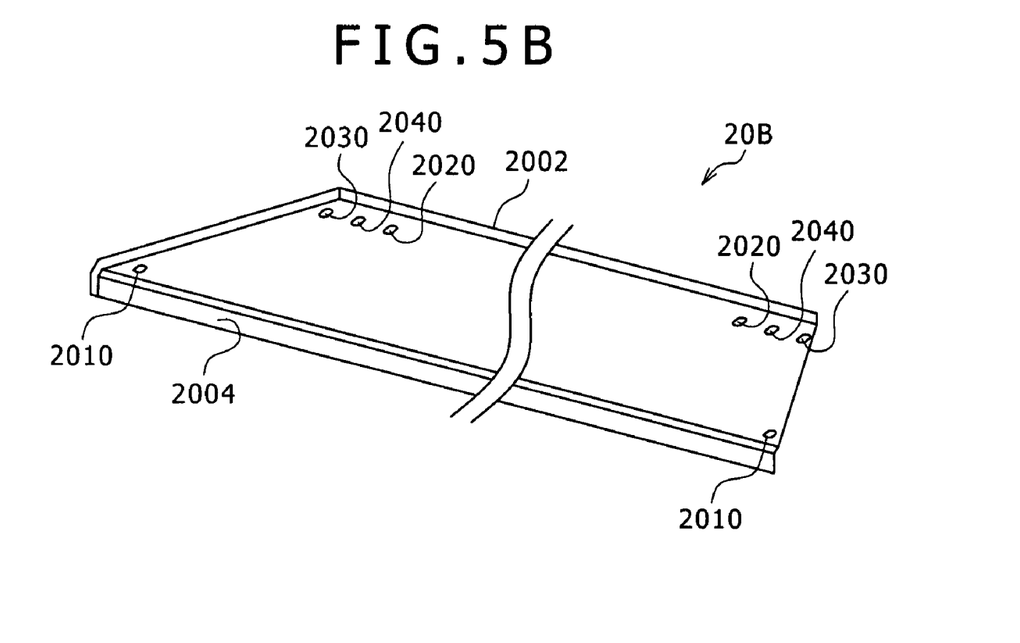
FIG. 5B is a view along arrow B of FIG. 5A.

FIG. 5A is a perspective view of a substrate cover 20B, and FIG. 5B is a view along arrow B of FIG. 5A.

As shown in FIGS. 1 and 3, the substrate covers 20 are provided respectively for the four edges of the reinforcing plates 18. The substrate covers 20 extend over the whole lengths of the four edges of the reinforcing plate 18, respectively. The substrate covers 20 cover the rigid substrates 26 and the flexible substrates 25 which are laid over the four edges of the back surface 2404 of the reinforcing plate 18, respectively.

The substrate covers 20 are formed of a material rigid enough to support the front cover 12 and rigid enough to protect the rigid substrates 26 and the flexible substrates 25. Example of such a material include metallic materials and rigid synthetic resins.

As shown in FIG. 3, the substrate covers 20 are composed of two major-edge-side substrate covers 20A provided correspondingly to the two major edges of the reinforcing plate 18, and two minor-edge-side substrate covers 20B provided correspondingly to the two minor edges of the reinforcing plate 18.

As shown in FIGS. 4A and 4B, the substrate cover 20A on the major edge side has a back surface part 2002 located on the rear side of the rigid substrate 26, and a side surface part 2004 bent from an end portion of the back surface part 2002 to the front side and located on a lateral side of the flexible substrate 25.

The back surface part 2002 of the substrate cover 20A is provided with screw passing holes 2010 at positions corresponding respectively to the three boss parts 2410 of the reinforcing plate 18. The screw passing holes 2010 are each formed in a slot shape extending in the direction orthogonal to the extending direction of the substrate cover 20A.

In addition, the back surface part 2002 of the substrate cover 20A is provided with slots 2020 at positions corresponding respectively to the two guide pins 2420 of the reinforcing plate 18. The slots 2020 each extend in the direction orthogonal to the extending direction of the substrate cover 20A, and are each guided by the guide pin 2420 in the extending direction thereof.

Besides, the back surface part 2002 of the substrate cover 20A is provided with screw passing holes 2030 at positions corresponding respectively to the three screw holes 2430 of the reinforcing plate 18. The screw passing holes 2030 each have a slot shape extending in the direction orthogonal to the extending direction of the substrate cover 20A.

In addition, the back surface part 2002 of the substrate cover 20A is provided with jig engaging holes 2040 at positions adjacent respectively to the slots 2020. The jig engaging holes 2040 are for engagement with jig engaging pins (not shown) for moving the substrate cover 20A in a predetermined direction at the time of assembly.

As shown in FIGS. 5A and 5B, the substrate cover 20B on the minor edge side, like the substrate cover 20A on the major edge side, has a back surface part 2002 located on the rear side of the rigid substrate 26, and a side surface part 2004 bent from an end portion of the back surface part 2002 to the front side and located on a lateral side of the flexible substrate 25.

The back surface part 2002 of the substrate cover 20B is provided with screw passing holes 2010 at positions corresponding respectively to the two boss parts 2410 of the reinforcing plate 18. The screw passing holes 2010 each have a slot shape extending in the direction orthogonal to the extending direction of the substrate cover 20B.

In addition, the back surface part 2002 of the substrate cover 20B is provided with slots 2020 at positions corresponding respectively to the two guide pins 2420 of the reinforcing plate 18. The slots 2020 each extend in the direction orthogonal to the extending direction of the substrate cover 20B, and are each guided by the guide pin 2420 in the extending direction thereof.

Besides, the back surface part 2002 of the substrate cover 20B is provided with screw passing holes 2030 at positions corresponding respectively to the two screw holes 2430 of the reinforcing plate 18. The screw passing holes 2030 each have a slot shape extending in the direction orthogonal to the extending direction of the substrate cover 20B.

In addition, the back surface part 2002 of the substrate cover 20B is provided with jig engaging holes 2040, similar to those in the substrate cover 20A, at positions adjacent respectively to the slots 2020.

As shown in FIG. 1, the rear cover 22 covers the back surface 1404 of the display device 14 and the back surface 1804 of the reinforcing plate 18, and also covers the outer side of the reinforcing plate 18. In this embodiment, the display device 14 and the reinforcing plate 18 are formed in profiles equal to each other in shape and size, so that the rear cover 22 covers the back surface 1804 of the reinforcing plate 18.

Figure 9:
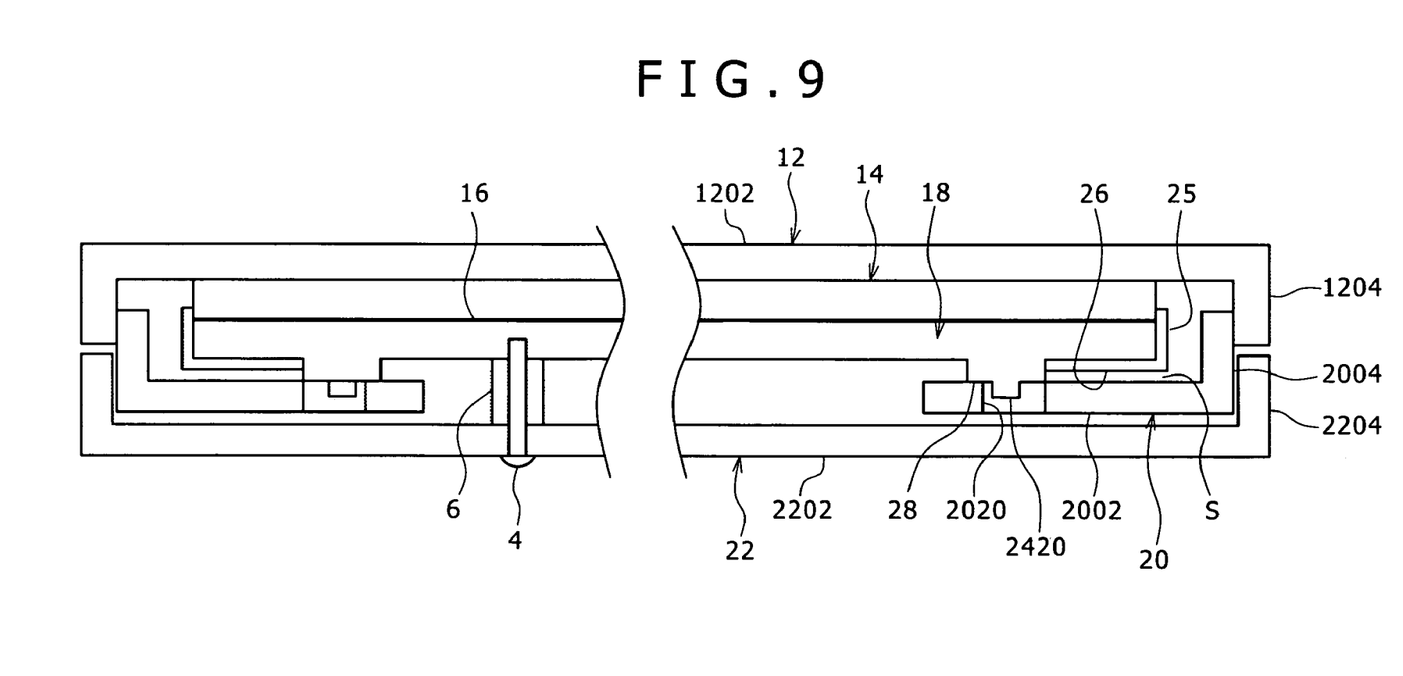
FIG. 9 illustrates the condition where a rear cover is attached to the reinforcing plate.

The rear cover 22 has a back surface part 2202 located on the rear side of the back surface 1404 of the display device 14 and the rear side of the back surface 1804 of the reinforcing plate 18, and side surface parts 2204 bent from the four edges of the back surface part 2202 to the front side and located on lateral sides of the reinforcing plate 18 and the substrate cover 20 (see FIG. 9).

The back surface part 2202 is formed in a rectangular shape larger in area than the reinforcing plate 18. The four edges of the back surface part 2202 are located on the outside of, and parallel respectively to, the four edges of the reinforcing plate 18.

Now, assembly of the display apparatus 10 will be described below.

Figure 6:
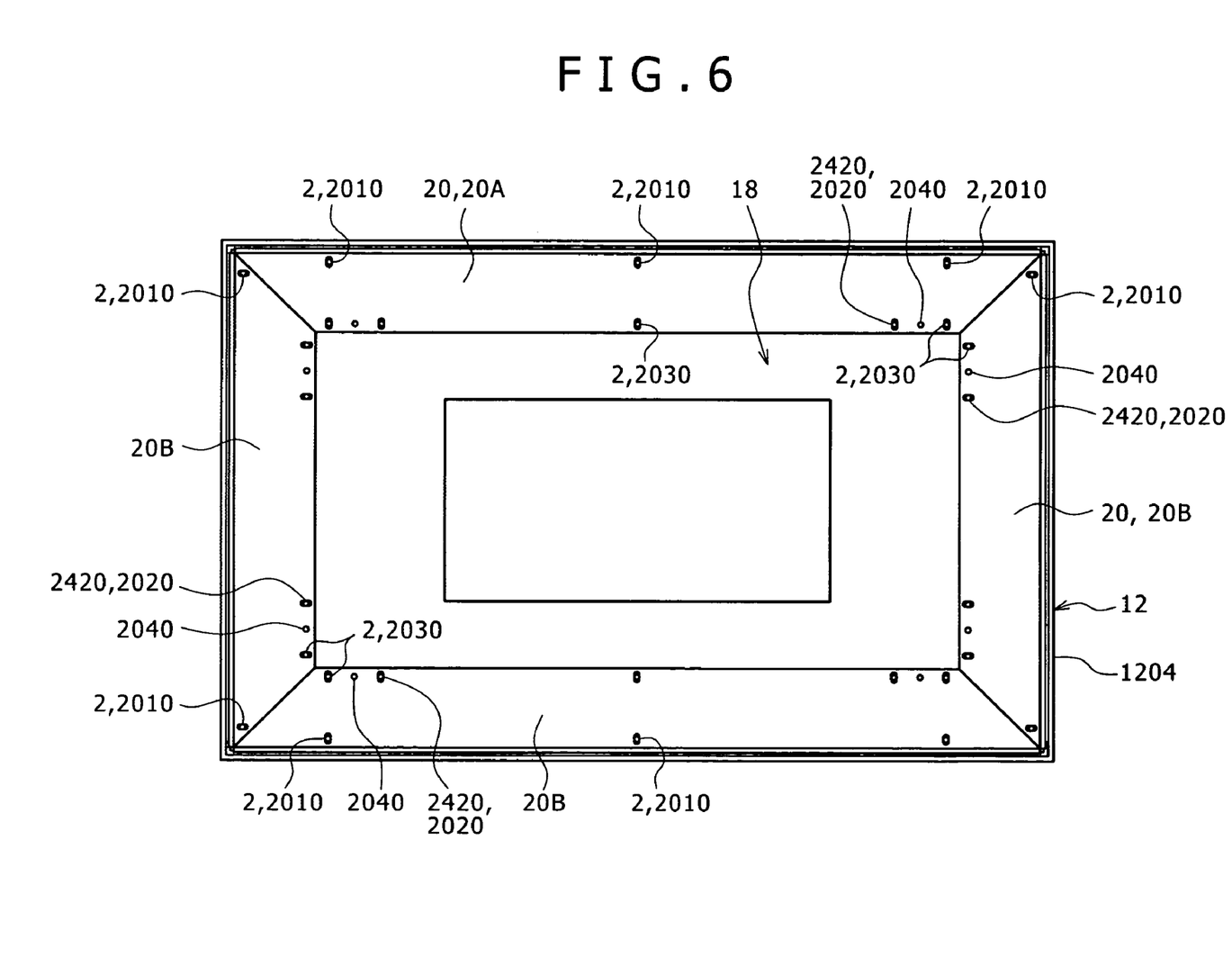
FIG. 6 illustrates the condition where the substrate cover is attached to the reinforcing plate.
Figure 8:
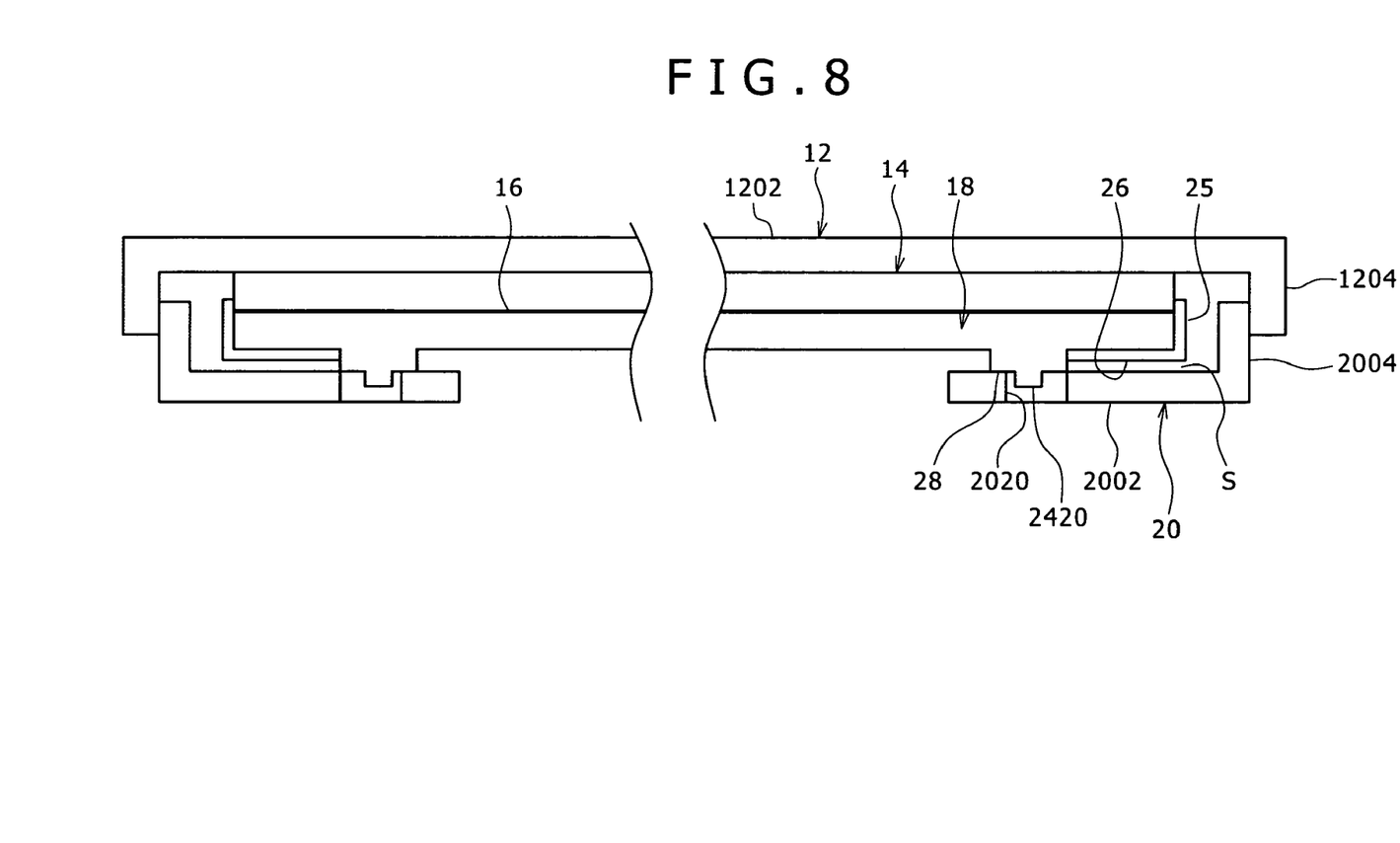
FIG. 8 illustrates the condition where the substrate cover is put in contact with a front cover.

FIG. 6 illustrates the condition where the substrate cover 20 is attached to the reinforcing plate 18, FIG. 7 illustrates the condition where the substrate cover 20 is tentatively fixed to the reinforcing plate 18, FIG. 8 illustrates the condition where the substrate cover 20 is put in contact with the front cover 12, and FIG. 9 illustrates the condition where the rear cover 22 is attached to the reinforcing plate 18.

As shown in FIG. 7, the front cover 12 is attached to the display device 14, the reinforcing plate 18 is attached to the display device 14 in the condition where the heat conductive sheet 16 is interposed therebetween, and the ridge substrates 26 are overlapped on and attached to the rectangular frame-like region 32.

In this condition, the ridge substrates 26 are covered with the substrate covers 20, and the substrate covers 20 are tentatively fixed to the reinforcing plate 18.

Specifically, the back surface parts 2002 of the substrate covers 20 are set to front on the rigid substrates 26, the side surface parts 2004 of the substrate covers 20 are set to front on lateral sides of the flexible substrate 25 and to front on the inside surfaces of the side surface parts 1204 of the front cover 12. In this condition, the back surface parts 2002 of the substrate covers 20 are mounted on the frame 28 and the boss parts 2410, and the guide pins 2420 are passed through the slots 2020.

As a result, as shown in FIGS. 6 and 7, the slots 2020 are guided by the guide pins 2420, and the substrate covers 20 can be moved in the directions for spacing away from the reinforcing plate 18 in the directions orthogonal to the extending directions of the four edges of the reinforcing plate 18, respectively. Namely, the substrate covers 20 are disposed so as to be movable in the directions for spacing away respectively from the four edges of the reinforcing plate 18 in the plane of the reinforcing plate 18.

In addition, as shown in FIG. 7, with the back surface parts 2002 of the substrate covers 20 mounted on the boss parts 2410 and the frame 28 of the reinforcing plate 18, accommodating spaces S sufficient in size for accommodating the rigid substrates 26 and the flexible substrates 25 are formed between the back surface part 2002 and the back surface part 2404 of the reinforcing plate 18, the back surface parts 2002 of the substrate covers 20 are disposed to be spaced from the rigid plates 26, and the side surface parts 2004 of the substrate covers 20 are disposed to be spaced from the flexible substrates 25; therefore, irrational forces would not be exposed on various electronic parts mounted on the rigid substrates 26 or on the flexible substrates 25.

Next, engaging pins of jigs (not shown) are engaged with the holes 2040 in the substrate covers 20, the substrate covers 20 are moved in the directions for spacing away from the reinforcing plate 18 in the directions orthogonal to the extending directions of the four edges of the reinforcing plate 18, and, as shown in FIG. 8, the outside surfaces of front portions of the side surface parts 2004 of the substrate covers 20 are put into contact with the inside surfaces of the side surface parts 1204 of the front cover 12.

In this condition, as shown in FIG. 6, screws 2 are screw engaged with the screw holes 2412 and 2430 through the screw passing slots 2010 and 2030, whereby the substrate covers 20 are fastened to the reinforcing plate 18.

Subsequently, in the condition where the outside surfaces of the front portions of the side surface parts 2004 and the inside surfaces of the side surface parts 1204 are in contact with and pressed against each other, the outside surfaces of the front portions of the side surfaces 2004 and the inside surfaces of the side surface parts 1204 are joined to each other by fusing them to each other by heating, for example. As a result, the front cover 12 is attached to the reinforcing plate 18 through the substrate covers 20.

Next, as shown in FIG. 9, the front ends of the side surface parts 2204 of the rear cover 22 are set to front on the rear ends of the side surface parts 1204 of the front cover 12, and a plurality of portions of a back surface part 2202 of the rear cover 22 are attached to the reinforcing plate 18 through screws 4 passed through tubular spacers 6.

In this manner, the assembly of the display apparatus 10 is completed.

According to this embodiment, the outside surfaces of the side surface parts 2004 of the substrate covers 20 and the inside surfaces of the side surface parts 1204 of the front cover 12 are joined to each other, without generating any gap therebetween, by utilizing the substrate covers 20 protecting the rigid substrates 26. Therefore, it is possible to achieve fine joining through preventing deformation of the side surface parts 1204 of the front cover 12.

In addition, since the rear ends of the side surface parts 1204 of the front cover 12 and the front ends of the side surface parts 2204 of the rear cover 22 are set to front on each other, there is no need to enhance the dimensional accuracy of both the front cover 12 and the rear cover 22, unlike in the related art. Therefore, the yields of the front cover 12 and the rear cover 22 can be enhanced, which is advantageous in enhancing the appearance quality of the display apparatus 10 while contriving a reduction in the manufacturing cost.

Besides, at the time of joining the outside surfaces of front portions of the side surface parts 2004 of the substrate covers 20 and the inside surfaces of the side surface parts 1204 of the front cover 12 to each other, the outside surfaces of the side surface parts 2004 of the substrate cover 20 and the inside surfaces of the side surface parts 1204 of the front cover 12 can be pressed against each other simply and assuredly by moving the substrate covers 20, as above-mentioned. Therefore, it is possible to achieve finer joining, which is advantageous in enhancing the appearance quality of the display apparatus 10.

In addition, unlike in the related art, the front cover 12 and the rear cover 22 are not joined to each other. Therefore, the rear cover 22 can be easily detached from the reinforcing plate 18, which is advantageous in contriving efficient adjustment work and maintenance work for the display device 14.

Incidentally, while in this embodiment description has been made of the case where the outside surfaces of the side surface parts 2004 of the substrate covers 20 and the inside surfaces of the side surface parts 1204 of the front cover 12 are joined to each other by fusing under heating, the joining between the front cover 12 and the substrate covers 20 may be conducted by adopting any of various joining methods publicly known, such as adhesion with an adhesive or a pressure sensitive adhesive double coated tape.

In addition, while a configuration in which the rear cover 22 is provided with the side surface parts 2204 and the front ends of the side surface parts 2204 are set to front on the rear ends of the side surface parts 1204 of the front cover 12 has been adopted in this embodiment, the structure of the side surface parts of the front cover 12 and the rear cover 22 may be contemplated in various ways and are arbitrary. For example, there may be adopted a structure in which the side surface parts 2204 of the rear cover 22 are extended on the outside of the side surface parts 1204 of the front cover 12 to the outer periphery of the front surface part 1202 of the front cover 12, or a structure in which the side surface parts 1204 of the front cover 12 are extended to the outer periphery of the back surface part 2202 of the rear cover 22 and the rear cover 22 is composed only of the back surface part 2202.

Besides, while the case in which the front cover 12 is treated with the AR coating has been described in this embodiment, various films which have been known can be adopted insofar as the front cover 12 is transparent.

In addition, while the case where the display device 14 is an organic EL display device has been described in the present embodiment, various thin plate form display devices which have been known, such as plasma display and liquid crystal display, can naturally be used as the display device 14.

It should be understood those skilled in the art that various modifications, combinations, sub-combinations and alterations may occur depending on designs and other factors insofar as they are within the scope of the appended claims or the equivalents thereof.

What is claimed is:

1. A display apparatus comprising:
    a rectangular thin plate form display device with a surface on one side in the thickness direction thereof as a display surface configured to display an image and with a surface on the other side as a back surface;
    rigid substrates each connected to an edge of said display device through a flexible substrate, operative to drive said display device, and each being elongate along said edge of said display device;
    a front cover covering said display surface of said display device;
    a rectangular thin plate form reinforcing plate attached to said back surface of said display device; and
    a rear cover covering said back surface of said display device and a back surface of said reinforcing plate;
    wherein said front cover having a front surface part located on the front side of said display surface, and side surface parts bent respectively from four edges of said front surface part to the rear side, and
    said rigid substrates are bent to the rear side respectively via the corresponding flexible substrates and are respectively overlapped with and attached to the four edges of the back surface of said reinforcing plate,
        wherein substrate covers are provided for respectively covering said rigid substrates overlapped with the four edges of said back surface of said reinforcing plate,
        said substrate covers each have a back surface part located on the rear side of said rigid substrate, and a side surface part bent from an end portion of said back surface part to the front side, and are movable in the directions for spacing away respectively from the edges of said reinforcing plate in the plane of said reinforcing plate, and
        outside surfaces of front portions of said side surface parts of said substrate covers are set in contact with, and joined to, the inside surfaces of said side surface parts of said front cover.

2. The display apparatus as set forth in claim 1,
    wherein said rear cover has a back surface part located on the rear side of said back surface of said display device and said reinforcing plate, and side surface parts bent respectively from four edges of said back surface part; and
    the front ends of said side surface parts of said rear cover front respectively on the rear ends of said side surface parts of said front cover, and a back surface part of said rear cover is screwed to said reinforcing plate.

3. The display apparatus as set forth in claim 1, wherein said substrate covers extend respectively over the whole lengths of the four edges of said reinforcing plate.

4. The display apparatus as set forth in claim 1, wherein said side surface parts of said substrate covers are located respectively on lateral sides of said flexible substrates, and cover said flexible substrates respectively.

5. The display apparatus as set forth in claim 1, wherein said back surface parts of said substrate covers are disposed to be spaced respectively from said rigid substrates, and said side surface parts of said substrate covers are disposed to be spaced respectively from said flexible substrates.

6. The display apparatus as set forth in claim 1, wherein said substrate covers are formed by use of a metallic material or rigid synthetic resin which is rigid enough to protect said rigid substrates and to support said front cover.

7. The display apparatus as set forth in claim 1, wherein said reinforcing plate is formed by use of a metallic material having excellent heat radiating property, and is attached to said back surface of said display device through a heat conducive sheet.

8. The display apparatus as set forth in claim 1, wherein said display device is an organic EL display.

9. The display apparatus as set forth in claim 1, wherein said front cover is formed by use of a synthetic resin material.

* * * * *